United States Patent
Kim et al.

(10) Patent No.: US 6,806,666 B2
(45) Date of Patent: Oct. 19, 2004

(54) SINGLE-PHASE MOTOR

(75) Inventors: Sang Young Kim, Kyungki-do (KR); Yo Han Lee, Seoul-si (KR); Jun Yong Lim, Inchun-si (KR); Yong Won Choi, Daejun-si (KR)

(73) Assignee: LG Electronics Inc., Seoul (KR)

( * ) Notice: Subject to any disclaimer, the term of this patent is extended or adjusted under 35 U.S.C. 154(b) by 48 days.

(21) Appl. No.: 10/299,784

(22) Filed: Nov. 20, 2002

(65) Prior Publication Data

US 2004/0061464 A1 Apr. 1, 2004

(30) Foreign Application Priority Data

Oct. 1, 2002 (KR) .................. 10-2002-0059927

(51) Int. Cl.[7] .................. H02K 17/32; H02K 23/68; H02K 27/30
(52) U.S. Cl. .................. 318/362; 318/701; 318/720; 318/721; 310/66; 310/68 B
(58) Field of Search .................. 310/66, 68 B; 318/138, 439, 432–434, 254, 830, 362, 700, 701, 720, 721

(56) References Cited

U.S. PATENT DOCUMENTS 6,091,170 A * 7/2000 Mayes et al. ............. 310/68 B
6,424,114 B1 * 7/2002 Komatsu .................. 318/721

FOREIGN PATENT DOCUMENTS

DE     BG2169755 A * 7/1986 .......... H02K/1/06

* cited by examiner

Primary Examiner—David Martin
Assistant Examiner—Tyrone Smith
(74) Attorney, Agent, or Firm—Greenblum & Bernstein, P.L.C.

(57) ABSTRACT

Disclosed is a single-phase motor including a stator, a rotor adapted to rotate when electric power is applied to the stator, a ring-shaped magnet coupled to the rotor to rotate along with the rotor; a parking magnet for stopping the rotor within an effective torque generating region by a magnetic force effected between the ring-shaped magnet and the parking magnet upon braking the rotor, and a sensor unit for sensing a variation in the intensity of a magnetic field generated around the ring-shaped magnet during the rotation of the rotor, thereby sensing the position and speed of the rotor. In accordance with this configuration, the additional device used for an initial driving operation and subsequent operations of the motor can be relatively simple and inexpensive. As a result, there is an advantage in that the motor has an enhanced utility.

11 Claims, 4 Drawing Sheets

SINGLE-PHASE MOTOR

BACKGROUND OF THE INVENTION

1. Field of the Invention

The present invention relates to a single-phase motor, and more particularly to a single-phase motor in which a ring-shaped magnet is mounted to a rotor in such a fashion that a parking magnet and a Hall sensor face the ring-shaped magnet.

2. Description of the Prior Art

Generally, single-phase motors include universal motors, BLDCS, or switched reluctance motors.

FIG. 1 is a circuit diagram illustrating the circuit configuration of a conventional single-phase switched reluctance motor.

As shown in FIG. 1, the conventional single-phase switched reluctance motor (SRM) includes a driving circuit 10, a stator 20 receiving electric power from the driving circuit 10, and a rotor 30 adapted to rotate by a reluctance torque generated between the stator 20 and the rotor 30 when electric power is applied to the stator 20.

In detail, the stator 20, which is arranged outside the rotor 30, includes a yoke 22 having a cylindrical structure opened at upper and lower end thereof, six poles 24 protruded from the inner surface of the yoke 22 toward the rotor 30 while being uniformly spaced apart from one another in a circumferential direction, and field coils 26 respectively wound on the protruded poles 24, and adapted to receive current from the driving circuit 10.

The rotor 30 includes a laminated core 34 having six poles 32 protruded from the outer inner surface of the core 34 while being uniformly spaced apart from one another in a circumferential direction. A rotating shaft 12 is axially mounted to the central portion of the rotor 30 so that it rotates along with the rotor 30, thereby externally transmitting the driving force of the motor.

The driving circuit 10 receives information about the position and speed of the rotor 30, and controls the intensity of current flowing through the field coils 26 based on the received information.

In the conventional single-phase switched reluctance motor having the above mentioned configuration, when current is supplied from the driving circuit 10 to the field coils 26, a reluctance torque is generated between the stator 20 and the rotor 30, thereby causing the rotor 30 to rotate in a direction exhibiting a minimum magnetic resistance.

Meanwhile, in the conventional single-phase switched reluctance motor, auxiliary coils (not shown) are wound on respective protruded poles 24 of the stator 20 in order to allow the rotating shaft 12 to always rotate in an effective rotating direction. When the current supplied from the driving circuit 10 is cut off, each protruded pole 32 of the rotor 30 is positioned within an effective torque generating region formed by an associated one of the protruded poles 24 of the stator 20, thereby allowing the rotor 30 to be initially driven in the effective rotating direction.

Accordingly, the conventional single-phase motor should use the additional device having a complex structure for its initial driving operation and subsequent operations. For this reason, the conventional single-phase motor has a low utility.

Furthermore, the conventional single-phase motor should use an optical sensor or Hall sensor (not shown) in order to acquire the information about the position and speed of the rotor required during the operation of the motor.

SUMMARY OF THE INVENTION

The present invention has been made in view of the problems involved with the Prior art, and an object of the invention is to provide a single-phase motor which can simply achieve the setting of the initial driving position of its rotor while simply implementing means for acquiring information about the position and speed of the rotor required for the operation of the motor, so that it has a high utility.

In accordance with the present invention, this object is accomplished by providing a single-phase motor comprising: a stator; a rotor adapted to rotate when electric power is applied to the stator; a ring-shaped magnet installed to rotate along with the rotor; a parking magnet for stopping the rotor within an effective torque generating region by a magnetic force effected between the ring-shaped magnet and the parking magnet upon braking the rotor, and a sensor unit for sensing a variation in the intensity of a magnetic field generated around the ring-shaped magnet during the rotation of the rotor, thereby sensing a position and speed of the rotor.

BRIEF DESCRIPTION OF THE DRAWINGS

The above objects, and other features and advantages of the present invention will become more apparent after a reading of the following detailed description when taken in conjunction with the drawings, in which.

DESCRIPTION OF THE PREFERRED EMBODIMENTS

Now, preferred embodiments of the present invention will be described in detail with reference to the annexed drawings.

Figure 1:
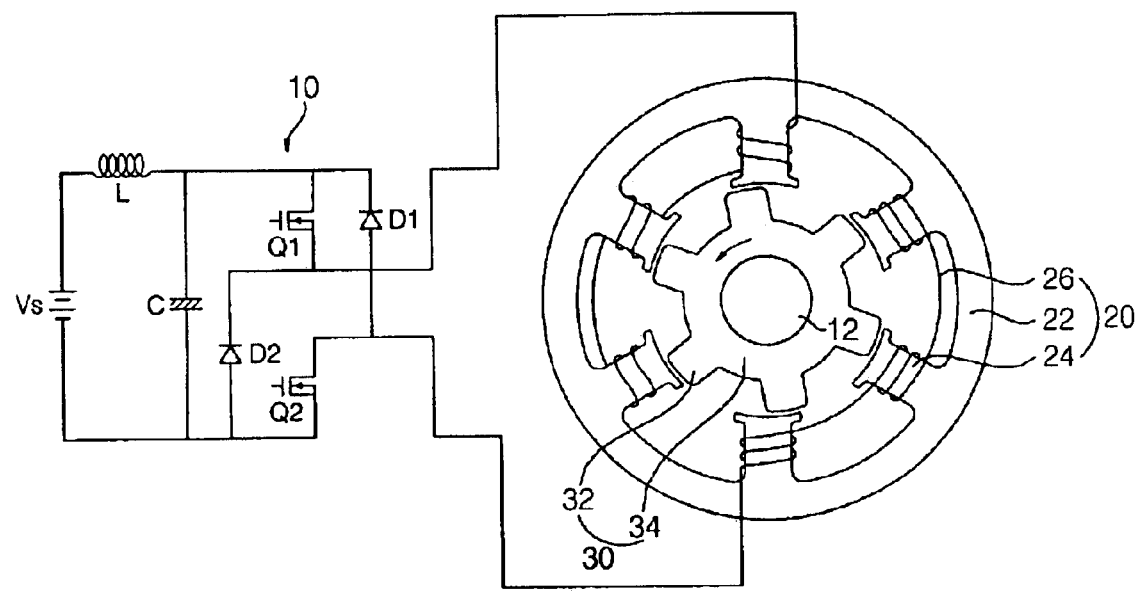
FIG. 1 is a circuit diagram of a conventional single-phase switched reluctance motor.
Figure 2:
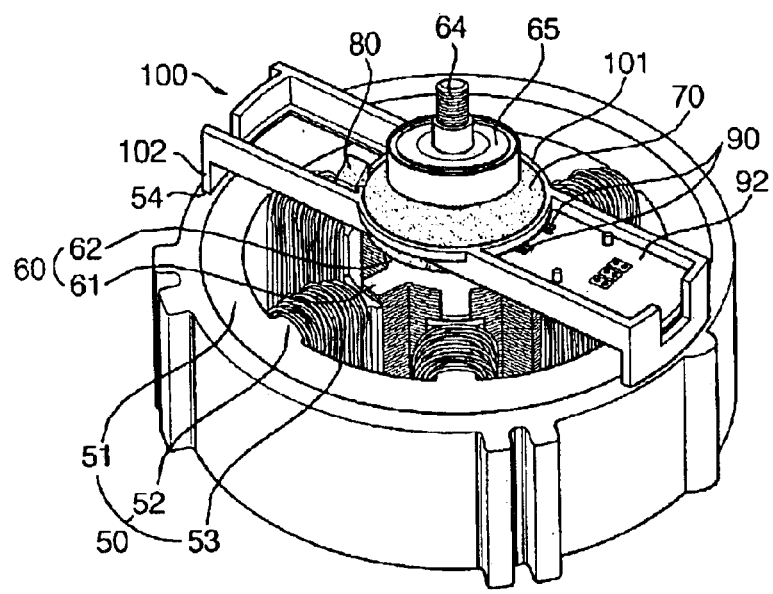
FIG. 2 is a perspective view illustrating a single-phase switched reluctance motor according to an embodiment of the present invention.
Figure 3:
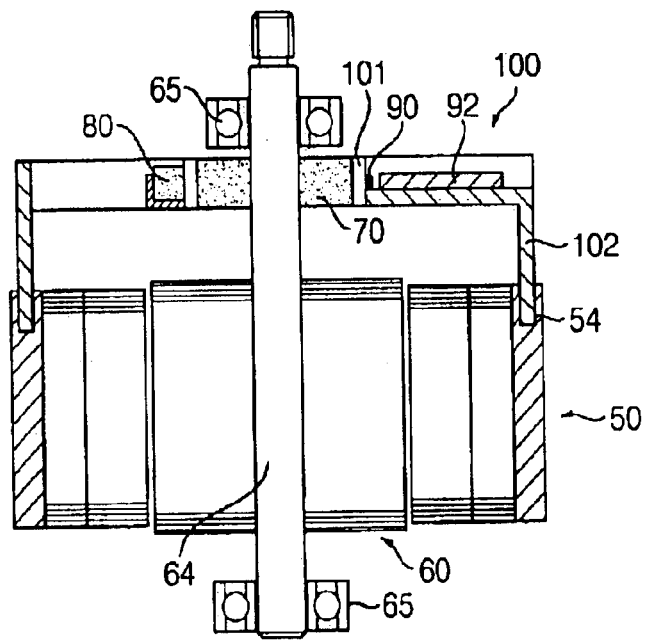
FIG. 3 is a sectional view of the single-phase switched reluctance motor according to the embodiment of the present invention.

FIG. 2 is a perspective view illustrating a single-phase switched reluctance motor according to an embodiment of the present invention. FIG. 3 is a sectional view of the single-phase switched reluctance motor according to the embodiment of the present invention.

AS shown in FIG. 2, the single-phase switched reluctance motor includes a stator 50, a rotor 60 rotatably arranged inside the stator 50, and adapted to rotate by a reluctance torque generated between the stator 50 and the rotor 60 when the electric power is applied to the stator 50, and a ring-shaped magnet 70 installed to rotate along with the rotor 60. The single-phase switched reluctance motor also includes a parking magnet 80 for stopping the rotor 60 within an effective torque generating region by a magnetic force effected between the ring-shaped magnet 70 and the parking magnet 80 upon braking the rotor 60, and a sensor unit 90 for sensing a variation in the intensity of a magnetic field generated around the ring-shaped magnet 70 during the rotation of the rotor 60, thereby sensing the position and speed of the rotor 60.

The stator 50 includes a yoke 51 having a cylindrical structure, six poles 52 protruded from the inner surface of the yoke 51 toward the rotor 60 while being uniformly spaced apart from one another in a circumferential direction, and field coils 53 respectively wound on the protruded poles 52.

The rotor 60 includes a laminated core 62 having six poles 61 protruded from the outer inner surface of the core 62 toward the stator 50 while being uniformly spaced apart from one another in a circumferential direction. A rotating shaft 64 is axially mounted to the central portion of the rotor 60 so that it rotates along with the rotor 60, thereby externally transmitting the driving force of the motor.

In a motor housing (not shown) defining the appearance of the motor, bearings 65 are mounted on the rotating shaft 64 at opposite ends of the rotating shaft 64 in order to rotatably support the rotating shaft 64, respectively.

Figure 4A:
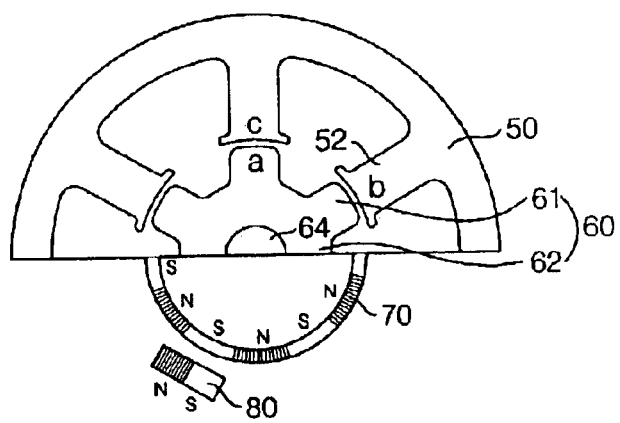
FIG. 4a is a view illustrating a state in which no determination has been made yet as to the braked position of the single-phase switched reluctance motor.
Figure 4B:
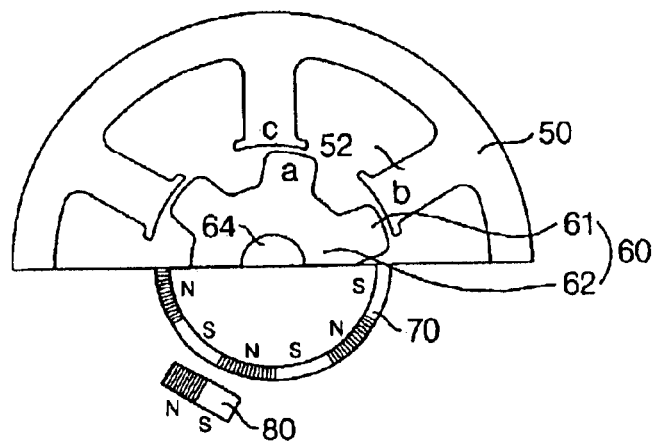
FIG. 4b is a view illustrating a state in which a determination has been made as to the braked position of the single-phase switched reluctance motor.

The ring-shaped magnet 70 is fixedly fitted around the upper portion of the rotating shaft 64 in such a fashion that N and S poles are alternately arranged in a circumferential direction, as shown in FIGS. 4a and 4b. In accordance with the present invention, the number of N or 1 poles in the ring-shaped magnet 70 corresponds to n times ("n" is a positive integer) the number of the poles 61 in the rotor 60. Preferably, the number of N or S poles in the ring-shaped magnet 70 is 6, which corresponds to the number of the poles 61 in the rotor 60.

Meanwhile, a retainer 100 is coupled to the upper surface of the stator 50 in a fitted fashion so that the parking magnet 80 and sensor unit 90 are supported while facing the ring-shaped magnet 70 in a radial direction.

The retainer 100 is centrally formed with a hole 101 so that it surrounds the outer circumferential surface of the ring-shaped magnet 70. The retainer 100 is also provided at its lower surface with fitting legs 102 adapted to be fitted in fitting grooves 54 formed at the upper surface of the stator 50. The fitting legs 102 have a desired length so that the parking magnet 80 and sensor unit 90 face the ring-shaped magnet 70 in a radial direction.

A printed circuit board 92 is installed on the retainer 100. On the printed circuit board 92, an electronic device is mounted which serves to control the motor based on information about the position and speed of the rotor 60 sensed by the sensor unit 90.

The parking magnet 80 is a bar magnet having one N pole and one S pole. At least one magnet is arranged, as the parking magnet 80, at one side of the retainer 100 with respect to the hole 101 of the retainer 100. When the current flowing through the field coil 53 of the stator 50 is cut off to brake the rotor 60, the parking magnet 80 serves to stop the rotor 60 within the effective torque generating region by a magnetic force generated in accordance with an interaction between the ring-shaped magnet 70 and the parking magnet 80, in order to make the rotating shaft 64 always rotate only in the effective rotating direction.

This will be described in more detail. When the rotor 60 starts up, it tends to rotate toward one of two poles 52 of the stator 50 to which the pole 61 of the rotor 60 positioned between the two poles 52 is closer than to the other pole 52. Accordingly, where the effective rotating direction of the rotating shaft 60 corresponds to, for example, a counter-clockwise direction, the parking magnet 80 serves to rotate the ring-shaped magnet 70 and rotor 60 by a desired angle when the current flowing through the field coil 53 of the stator 50 is cut off to brake the rotor 60, so as to stop the rotor 50 in a state in which the pole 61 of the rotor 60 represented by "a" positioned between the clockwise pole 52 of the stator 50 represented by "b" and the counter-clockwise pole 52 of the stator 50 represented by "c" is closer to the counter-clockwise pole "c" than to the clockwise pole "b".

The sensor unit 90 comprises a Hall sensor adapted to sense the polarity of the pole of the ring-shaped magnet 70 facing the sensor unit 90 in accordance with a Hall effect. At least one Hall sensor is arranged, as the sensor unit 90, at the other side of the parking magnet 80 with respect to the hole 101 of the retainer 100, so that it senses a variation in the intensity of a magnetic field generated around the ring-shaped magnet 70 during the rotation of the rotor 60, thereby sensing the position and speed of the rotor 60.

Now, the operation of the single-phase switched reluctance motor having the above described configuration will be described.

When current flows through the field coil 53 of the stator 50 under the condition in which the rotor 60 is positioned within the effective torque generating region in accordance with an interaction between the ring-shaped magnet 70 and the parking magnet 80, a reluctance torque is generated between the stator 50 and the rotor 60, thereby causing the rotor 60 to rotate in an effective rotating direction along with the rotating shaft 64 and ring-shaped magnet 70.

At this time, the sensor unit 80 senses a variation in the magnetic field generated around the ring-shaped magnet 70 in accordance with the rotation of the ring-shaped magnet 70, thereby sensing the position and speed of the rotor 60. Thus, the sensor unit 80 enables the rotor 60 to be controlled based on the sensed result.

Meanwhile, when the current flowing through the field coil 53 of the stator 50 is cut off, the rotor 60, ring-shaped magnet 70, and rotating shaft 64 are stopped. Where a repulsion is generated between the ring-shaped magnet 70 and the parking magnet 80 as those magnets 70 and 80 are positioned such that their poles having opposite polarities face each other, the ring-shaped magnet 70 is rotated a certain angle by the repulsion, and then stopped at a position where an attraction is effected between the ring-shaped magnet 70 and the parking magnet 80.

In accordance with the rotation of the ring-shaped magnet 70, the rotor 60 is also rotated because it is integral with the ring-shaped magnet 70, and then stopped in a state in which each pole 61 of the rotor 60 is stopped within an effective torque generating region.

Figure 5A:
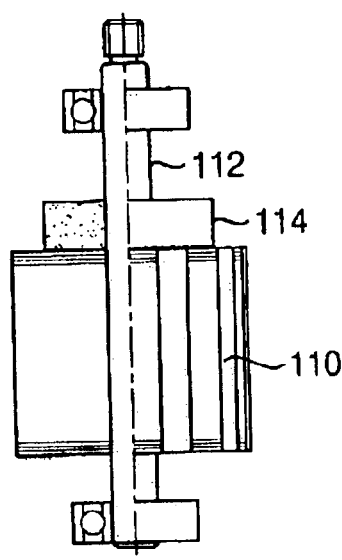
FIG. 5a is a partially-broken elevation view illustrating a ring-shaped magnet mounting construction according to another embodiment of the present invention.
Figure 5B:
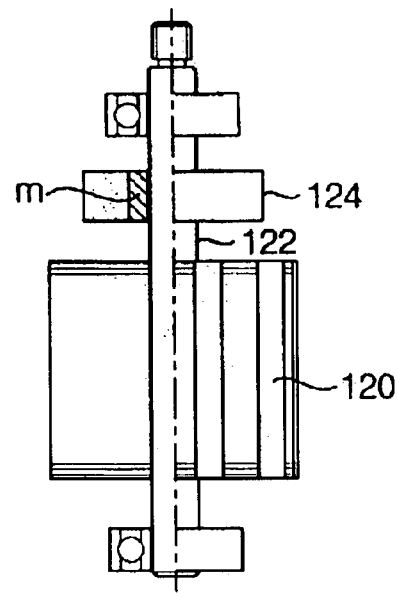
FIG. 5b is a partially-broken elevation view illustrating a ring-shaped magnet mounting construction according to another embodiment of the present invention.

FIGS. 5a and 5b illustrate different ring-shaped magnet mounting constructions according to other embodiments of the present invention.

In accordance with the embodiment shown in FIG. 5a, a rotating shaft 112 is centrally mounted to a rotor 110 so that it rotates along with the rotor 110. A ring-shaped magnet 114 is vertically fitted around the rotating shaft 112. The ring-shaped magnet 114 is fixedly mounted on the upper surface of the rotor 110 in a laminated state.

In accordance with the embodiment shown in FIG. 5b, a rotating shaft 122 is centrally mounted to a rotor 120 so that it rotates along with the rotor 120. A ring-shaped magnet 124 is used which has an inner diameter larger than the outer diameter of the rotating shaft 122. The ring-shaped magnet 124 is loosely fitted around the upper portion of the rotating shaft 122 while being upwardly spaced apart from the rotor 120 by a desired distance. A molding material m is molded between the rotating shaft 122 and the ring-shaped magnet 124, so that the ring-shaped magnet 124 is fixed to the rotating shaft 122 in order to rotate along with the rotating shaft 122.

The remaining construction of the single-phase switched reluctance motor shown in FIG. 5a or 5b is identical to that of FIGS. 3 and 4, except for the ring-shaped magnet mounting construction. Accordingly, no further description will be given in conjunction with the motor of FIG. 5a or 5b.

Figure 6:
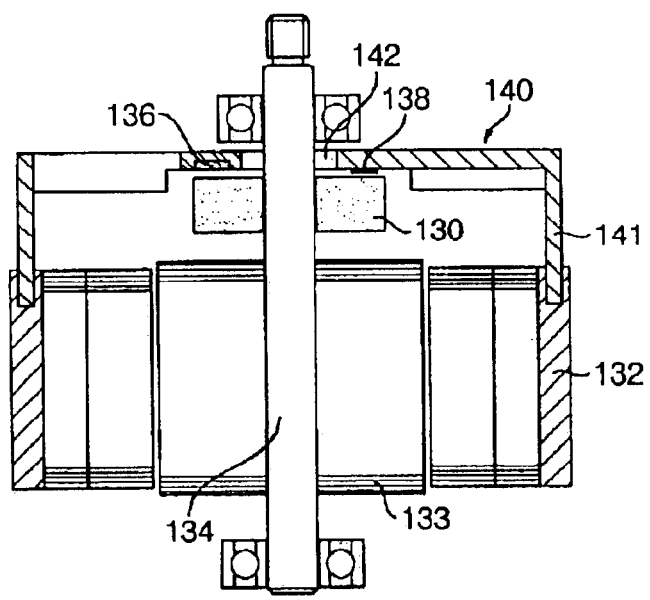
FIG. 6 is a sectional view illustrating an arrangement of a ring-shaped magnet, parking magnet, and sensor unit according to another embodiment of the present invention.

FIG. 6 illustrates an arrangement of the ring-shaped magnet, parking magnet, and sensor unit according to another embodiment of the present invention.

Referring to FIG. 6, a retainer 140 is illustrated which has fitting legs 141. The fitting legs 141 extend toward a stator 132 by a desired length while being coupled to the upper surface of the stator 132 so that the retainer 140 is arranged above a ring-shaped magnet 130 fitted around a rotating shaft 134. The rotating shaft 134 is centrally mounted to a rotor 133 so that it rotates along with the rotor 133. The retainer 140 is centrally formed with a hole 142 through which the rotating shaft 134 extends. A parking magnet 136 and a sensor unit 138 are mounted to the lower surface of the retainer 140 in such a fashion that they axially face the ring-shaped magnet 130.

The remaining construction of the single-phase switched reluctance motor shown in FIG. 6 is identical to that of FIGS. 3 and 4, except for the shape of the retainer, and the arrangement of the parking magnet, sensor unit, and ring-shaped magnet. Accordingly, no further description will be made in conjunction with the motor of FIG. 6.

As apparent from the above description, the present invention provides a single-phase motor in which a ring-shaped magnet is coupled to a rotor, and a parking magnet is arranged at one side of the ring-shaped magnet such that they face each other, in order to stop the rotor within an effective torque generating region in accordance with a magnetic force effected between the ring-shaped magnet and the parking magnet upon braking the rotor. Accordingly, the rotor can always be rotated in an effective rotating direction. A Hall sensor is also arranged opposite to the ring-shaped magnet so as to sense the position and speed of the rotor during the rotation of the rotor. Accordingly, the additional device used for an initial driving operation and subsequent operations of the motor can be relatively simple and inexpensive. As a result, there is an advantage in that the motor has an enhanced utility.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A single-phase motor comprising:
   a stator;
   a rotor configured to rotate when electric power is applied to the stator;
   a ring-shaped magnet configured to rotate along with the rotor; and
   a parking magnet that stops the rotor within an effective torque generating region by a magnetic force effected between the ring-shaped magnet and the parking magnet upon braking the rotor,
   wherein a retainer is mounted to an upper surface of the stator while surrounding the ring-shaped magnet to retain the parking magnet so that the parking magnet faces the ring-shaped magnet.

2. The single-phase motor according to claim 1, wherein the ring-shaped magnet has N and S poles alternately arranged in a circumferential direction, and the number of the N or S poles corresponds to n times ("n" is a positive integer) the number of poles provided at the rotor.

3. The single-phase motor according to claim 1, wherein the ring-shaped magnet is fixedly fitted around an end portion of a rotating shaft axially installed to rotate along with the rotor.

4. The single-phase motor according to claim 3, wherein the ring-shaped magnet is fixed to the rotating shaft by a molding material molded between the rotating shaft and the ring-shaped magnet.

5. The single-phase motor according to claim 1, wherein the ring-shaped magnet is fixedly mounted on a surface of the rotor in a laminated state.

6. The single phase motor according to claim 1, wherein the parking magnet faces the ring-shaped magnet in a radial direction.

7. The single-phase motor according to claim 1, wherein the parking magnet faces the ring-shaped magnet in an axial direction.

8. A single-phase motor comprising:
   a stator;
   a rotor configured to rotate when electric power is applied to the stator;
   a ring-shaped magnet configured to rotate along with the rotor; and
   a parking magnet that stops the rotor within an effective torque generating region by a magnetic force effected between the ring-shaped magnet and the parking magnet upon braking the rotor; and
   a sensor unit that senses a variation in the intensity of a magnetic field generated around the ring-shaped magnet during the rotation of the rotor, thereby sensing a position and speed of the rotor,
   wherein a retainer is mounted to an upper surface of the stator while surrounding the ring-shaped magnet, and the sensor unit is mounted to the retainer to face the ring-shaped magnet.

9. The single-phase motor according to claim 8, wherein the sensor unit faces the ring-shaped magnet in a radial direction.

10. The single-phase motor according to claim 8, wherein the sensor unit faces the ring-shaped magnet in an axial direction.

11. The single-phase motor according to claim 8, wherein the sensor unit comprises a Hall sensor adapted configured to sense the polarity of the ring-shaped magnet during the rotation of the rotor, using a Hall effect.

* * * * *

UNITED STATES PATENT AND TRADEMARK OFFICE
CERTIFICATE OF CORRECTION

PATENT NO. : 6,806,666 B2
DATED : October 19, 2004
INVENTOR(S) : K. Kadoya et al.

It is certified that error appears in the above-identified patent and that said Letters Patent is hereby corrected as shown below:

<u>Column 6,</u>
Line 60, after "sensor" delete "adapted".

Signed and Sealed this

Twenty-first Day of June, 2005

JON W. DUDAS
*Director of the United States Patent and Trademark Office*